(12) United States Patent
Hartung et al.

(10) Patent No.: US 7,665,116 B2
(45) Date of Patent: Feb. 16, 2010

(54) NETWORK ARCHITECTURE FOR REAL TIME DELIVERY OF VIDEO OVER LOSSY NETWORKS FROM REMOTE LOCATIONS

(75) Inventors: John Hartung, Mableton, GA (US); Santhana Krishnamachari, Mableton, GA (US); Junfeng Bai, Atlanta, GA (US)

(73) Assignee: ARRIS Group, Inc., Suwanee, GA (US)

( * ) Notice: Subject to any disclaimer, the term of this patent is extended or adjusted under 35 U.S.C. 154(b) by 539 days.

(21) Appl. No.: 11/260,707

(22) Filed: Oct. 27, 2005

(65) Prior Publication Data

US 2006/0088063 A1 Apr. 27, 2006

Related U.S. Application Data

(60) Provisional application No. 60/622,050, filed on Oct. 27, 2004.

(51) Int. Cl.
*H04N 7/173* (2006.01)
(52) U.S. Cl. .................. 725/114; 370/238; 370/395.2; 370/498
(58) Field of Classification Search .................. 370/238
See application file for complete search history.

(56) References Cited

U.S. PATENT DOCUMENTS

| | | | |
|---|---|---|---|
| 5,099,319 A | 3/1992 | Esch et al. | |
| 5,283,639 A | 2/1994 | Esch et al. | |
| 6,006,265 A | 12/1999 | Rangan et al. | |
| 6,055,314 A | 4/2000 | Spies et al. | |
| 6,112,239 A | 8/2000 | Kenner et al. | |
| 6,154,771 A | 11/2000 | Rangan et al. | |
| 6,154,772 A | 11/2000 | Dunn et al. | |
| 6,536,043 B1 | 3/2003 | Guedalia | |
| 6,789,123 B2 | 9/2004 | Li et al. | |
| 6,804,827 B1 | 10/2004 | Furukawa et al. | |
| 6,857,012 B2 | 2/2005 | Sim et al. | |
| 6,970,939 B2 | 11/2005 | Sim | |
| 7,020,086 B2 * | 3/2006 | Juttner et al. | 370/238 |

(Continued)

OTHER PUBLICATIONS

"Multi-constraint QoS routing using a new single mixed metric," Khadivi, P.; Samavi, S.; Todd, T.D.; Saidi, H.; 2004 IEEE International Conference on Communications, vol. 4, Jun. 20-24, 2004 pp. 2042-2046 vol. 4.*

(Continued)

*Primary Examiner*—Joseph P. Hirl
*Assistant Examiner*—Joshua Taylor
(74) *Attorney, Agent, or Firm*—Troy A. Van Aacken; Robert J. Starr

(57) ABSTRACT

A method for content delivery comprising transmitting content via a first network to a content aggregation point and transmitting the content from the content aggregation point via a second network to a receiver at the request of the receiver. A system for content delivery comprising a content provider, a content aggregation point operatively coupled to the content provider via a first network wherein the content aggregation point receives content from the content provider, and a receiver operatively coupled to the content aggregation point via a second network wherein the receiver is configured to request content from the content aggregation point. Also disclosed are methods for improving the network functionality through in-band measurement of network statistics, multi-constraint based QoS routing, and back up path determination.

18 Claims, 9 Drawing Sheets

U.S. PATENT DOCUMENTS

2004/0139480 A1 7/2004 Delpuch et al.
2006/0088263 A1 4/2006 Tanaka et al.

OTHER PUBLICATIONS

PCT/US2005/038927, May 1, 2007, International Preliminary Report on Patentability.
PCT/US2005/038927, Apr. 27, 2007, Written Opinion.
PCT/US2005/038927, Apr. 26, 2007, International Search Report.
Jain, M., Dovrolis, C. Pathload: A Measurement Tool for End-to-End Available Bandwidth, Proceedings of Passive and Active Measurements(PAM) 2002 workshop, pp. 14-25, Fort Collins, CO.
Dijkstra, E. W., et al. "A Note on two problems in connection with graphs." Numerische Mathematik, No. 1, p. 260-271, 1959.

* cited by examiner

NETWORK ARCHITECTURE FOR REAL TIME DELIVERY OF VIDEO OVER LOSSY NETWORKS FROM REMOTE LOCATIONS

CROSS REFERENCE TO RELATED PATENT APPLICATIONS

This application claims priority to U.S. Provisional Application No. 60/622,050 filed Oct. 27, 2004, herein incorporated by reference in its entirety.

BACKGROUND OF THE INVENTION

Cable video delivery networks are evolving to architectures that will allow individualized content to be delivered to each receiver. This is occurring both in MSO (Multiple System Operator) networks through switched broadcast architectures, and in telco video offerings that use DSL delivery using packet switched networks. This change in architecture has both been driven by new types of content, such as VOD (Video On Demand) and NPVR (Network-based Personal Video Recorder), and is availing the network operator of additional revenue through new content services. However, these new services to date, have been limited to services broadcast to a head end via satellite and off-air, or content delivered non-real time to a head end for play out from servers. Content is switched from the head end to the receiver, but content is not switched to the head end as demanded by the network. This severely limits the amount of content available due to the cost of satellite distribution and server cost.

SUMMARY OF THE INVENTION

A method for content delivery comprising transmitting content via a first network to a content aggregation point and transmitting the content from the content aggregation point via a second network to a receiver at the request of the receiver. A system for content delivery comprising a content provider, a content aggregation point operatively coupled to the content provider via a first network wherein the content aggregation point receives content from the content provider, and a receiver operatively coupled to the content aggregation point via a second network wherein the receiver is configured to request content from the content aggregation point.

A method for in-band measurement of network statistics comprising adding a first timestamp from a first local clock in a first node to a first packet and a second packet wherein the first timestamp represents an intended packet transmission time. Adding a second timestamp from the first local clock in the first node to the first packet and the second packet wherein the second timestamp represents an actual packet transmission time. Transmitting the packets from the first node to a second node. Determining a third timestamp wherein the third timestamp represents a packet arrival time from a second local clock at the second node. Estimating network statistics based on the first, second, and third timestamps.

A system for in-band measurement of network statistics comprising a first node wherein the first node is configured to add a first timestamp from a first local clock in the first node to a first packet and a second packet wherein the first timestamp represents an intended packet transmission time and the first node is configured to add a second timestamp from the first local clock in the first node to the first packet and the second packet wherein the second timestamp represents an actual packet transmission time. A second node, operatively coupled to the first node, wherein the second node is configured to receive the first and second packets and the second node is configured to determine a third timestamp wherein the third timestamp represents a packet arrival time from a second local clock at the second node and a means for estimating network statistics based on the first, second, and third timestamps.

A method for multi-constraints based QoS routing for content distribution over a network comprising filtering a network topology with a first set of QoS constraints resulting in a filtered network topology, determining a least cost path that satisfies a second set of QoS constraints, and balancing a network load according to the least cost path.

A method for generating a backup path for a network comprising classifying flows over a link and determining a backup path for each class.

Additional advantages of the invention will be set forth in part in the description which follows or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION OF THE INVENTION

Before the present methods and systems are disclosed and described, it is to be understood that this invention is not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "an encoder" includes mixtures of encoders, reference to "an encoder" includes mixtures of two or more such encoders, and the like.

Ranges may be expressed herein as from "about" one particular value, and/or to "about" another particular value.

When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present invention may be understood more readily by reference to the following detailed description of preferred embodiments of the invention and the examples included therein and to the Figures and their previous and following description.

I. Network Architecture

Figure 1:
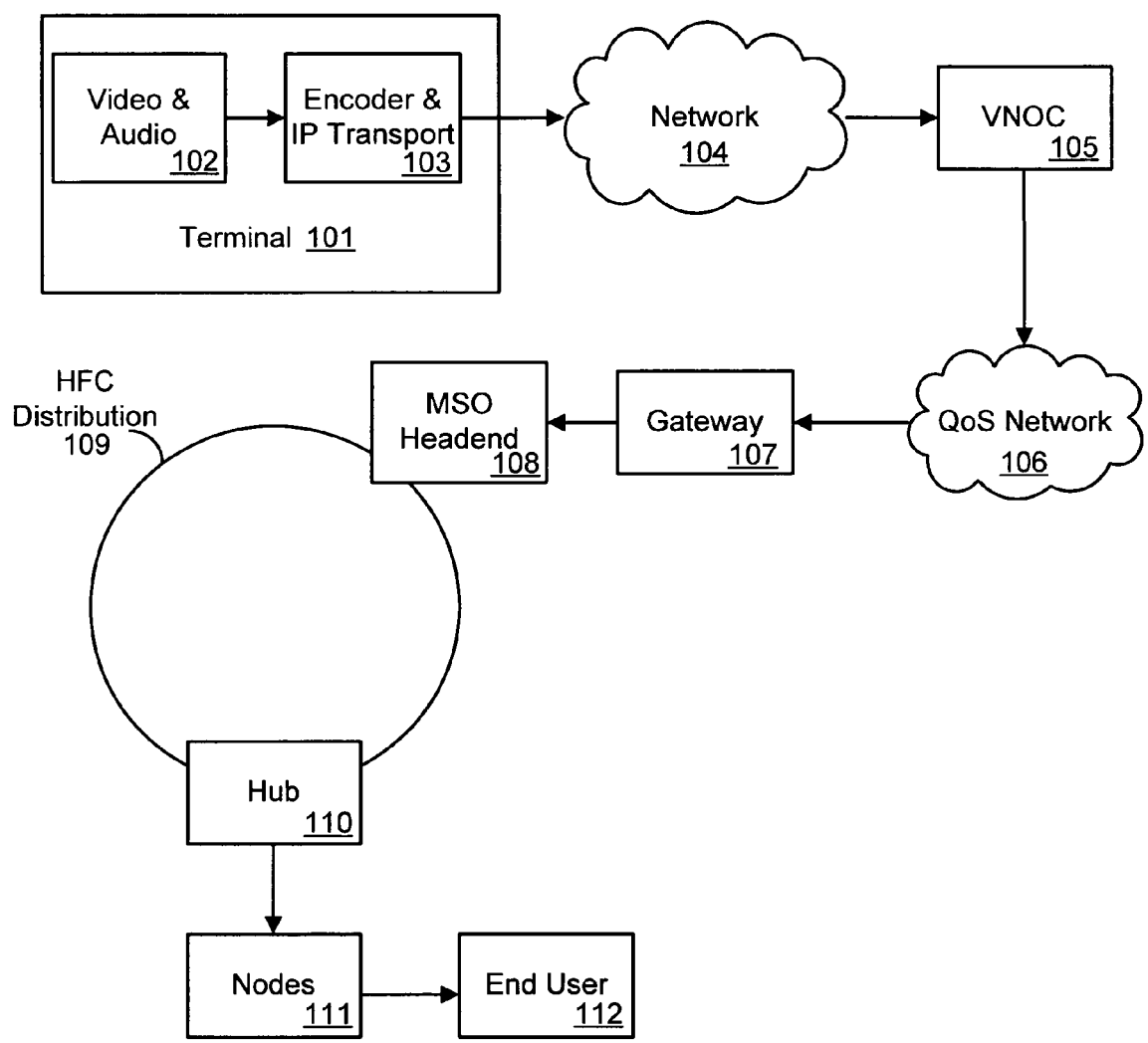
FIG. 1 illustrates an exemplary diagram of the disclosed network architecture.

Described herein is a network architecture that enables content switching from a content provider to a head end using economical public and private IP networks. An exemplary diagram of the architecture is shown in FIG. 1. The following description illustrates the use of a lossy and a lossless network, however, the use of more than one lossy network is contemplated, the use of more than one lossless network is contemplated, and the use of more than one lossy network and more than one lossless network is contemplated. The designation of any network as public or private has no bearing on the substance of the invention.

As illustrated in FIG. 1, a network can be partitioned into two parts. The first part of the network can be a lossy connection from one or more content providers (terminal) to one or more content aggregation points (for example, a vNOC-Virtual Network Operations Center). A content provider can be, for example, a broadcast television company. Content can be, for example, real-time audio/visual content (stream). A content aggregation point can be, for example, a data center. As shown in FIG. 1, the terminal 101 can comprise video data and audio data 102 (content) that is provided to an encoder for encoding and IP transport 103. The resultant stream can be transmitted through a lossy connection, for example a network such as the Internet 104 to a content aggregation point such as vNOC 105. The vNOC 105 can use buffering and a protocol to recover from losses on the network link and can introduce a delay (seconds to minutes in duration) on initial connection.

Figure 3:
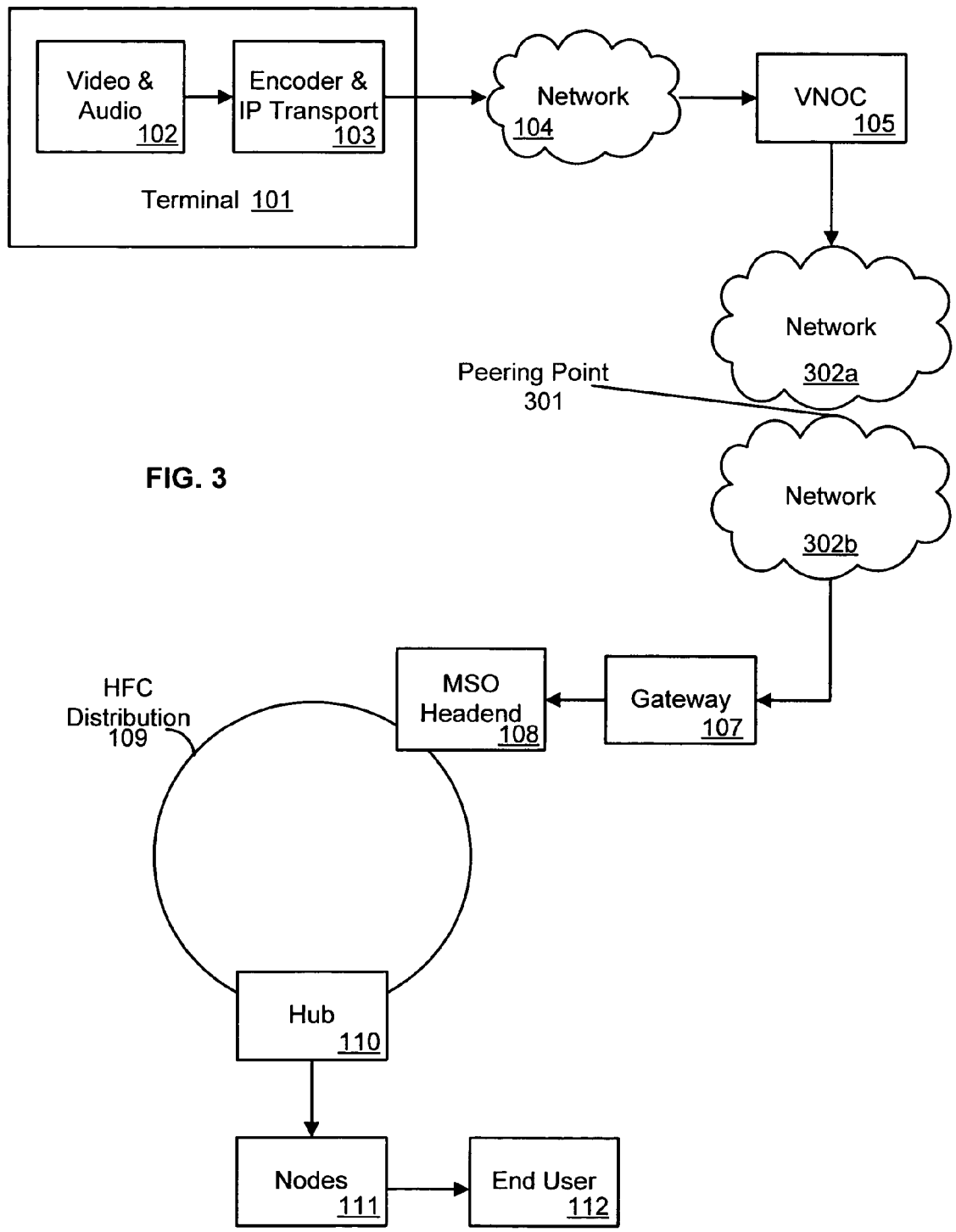
FIG. 3 illustrates an exemplary diagram of the disclosed network architecture.

The second part of the network can be a near lossless, low latency connection from the vNOC to the head ends of each subscribing MSO, for example, a private network. As shown in FIG. 1, the vNOC 105 can transmit the stream through a near lossless, low latency connection, for example a private network such as QoS Network 106. In some cases this network connection can be shared by more than one network, for example between two networks 302a and 302b, these networks can be QoS Networks, with network peering points 301 as shown in FIG. 3. These peering points can include points MSOs use to provide DOCSIS (Data Over Cable Service Interface Specifications) data services. A peering point is a place where many networks interconnect together to exchange traffic on a peering basis. It allows a network to peer with many other networks but only endure the expense of a connection to one place. This connection can terminate on a gateway 107 that can handle, for example, program metadata, backoffice billing, and switch and format content on receiver demand to an MSO headend 108, MSO video or IP network.

The MSO headend 108 can provide the video/audio data to an end user 112 (receiver) via an HFC (hybrid fibre-coax) Distribution 109, for example. Other distribution means known in the art are specifically contemplated. The stream can pass through a hub 110 and node 111 as it is transmitted to an end user 112.

FIG. 1 illustrates the distribution of content from a terminal 101 at a location remote from a service provider HFC Distribution network 109 to an end user terminal 112 on the service provider network. Economy and high quality are achieved on lossy and lossless networks through the use of an intermediary vNOC 105 and service provider gateway 107. The vNOC 105 communicates with the terminal 112 to obtain program information, and other content, and communicates this information to the gateway 107 and subsequently to the user terminal 112 through standard guide systems. The vNOC 105 also implements techniques to mitigate the degradation of media quality due to imperfect transmission through the network 104. These techniques include, but are not limited to, error correction and concealment performed in conjunction with the terminal. In performing these techniques, delays may be introduced by the vNOC 105 that would be unacceptable to the end user, however, this delay is incurred by the vNOC 105 before presentation of the content to the end user through the low-delay QoS Network 106 and HFC distribution network 109. By aggregating content in a single or multiple vNOCs, multiple end user's can receive high quality content without delays in functions such as channel switching. The gateway 107 processes the information and content received from the vNOCs 105 and reformats it to make it compatible with the service provider's HFC network 109. This may include modification in the presentation of the data, conversion of interfaces, or transcoding of content.

The network architecture disclosed provides a system wherein an end user 112 receiver can request a program distributed from the vNOC and no latency is needed to begin reception since the buffering needed to absorb the upstream losses has been absorbed by the vNOC that is already receiving and aggregating all content available at the head end. Content can be efficiently distributed to the head end using multicast join when content is requested by a receiver(s).

Figure 2:
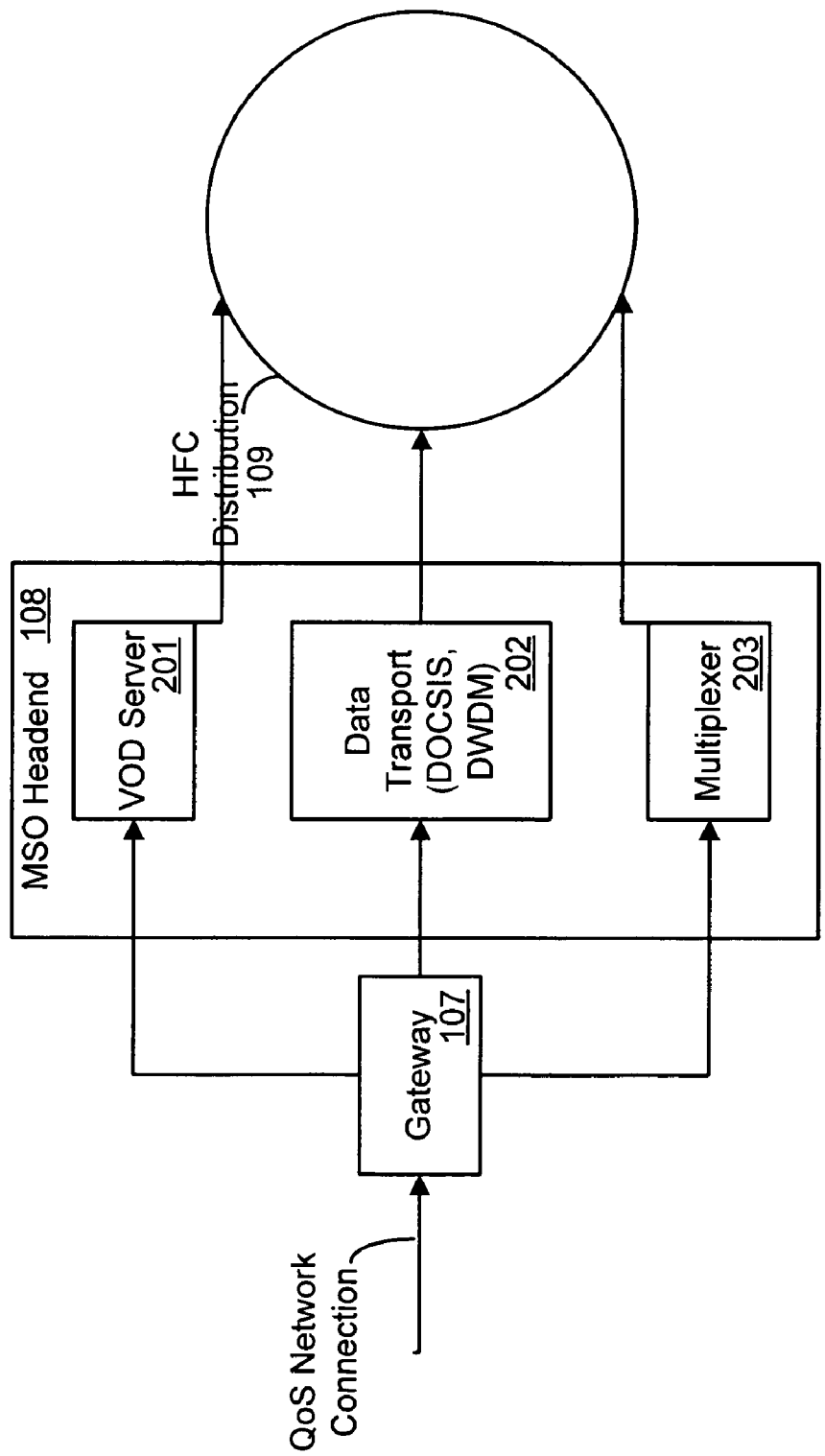
FIG. 2 illustrates in greater detail the connections between a gateway, an MSO headend, and an HFC distribution network.

FIG. 2 illustrates in greater detail the connections between a gateway 107, an MSO headend 108, and an HFC distribution network 109. Video/audio data 102 can be distributed on demand from the gateway to an end user using the existing VOD architecture (including VOD server 201) by providing guide and metadata information to the network VOD interfaces from the vNOC 105 through the gateway 107. In this way, on demand content can be requested by and delivered to an end user from a remote terminal 101 as shown in FIG. 1. Alternatively, broadcast programming can be distributed to an end user by providing a video/audio stream from the gateway 107 directly to a headend MPEG multiplexer 203 and subsequently through the standard MPEG over QAM transport architecture to a standard set top box at the end user's location. Finally, both on demand and broadcast content can be distributed to the end user via MPEG over IP using the service provider's data network (including Data Transport 202) for distribution over the core, edge, and access networks using standard DWDM, Ethernet, and DOCSIS distribution.

Figure 9:
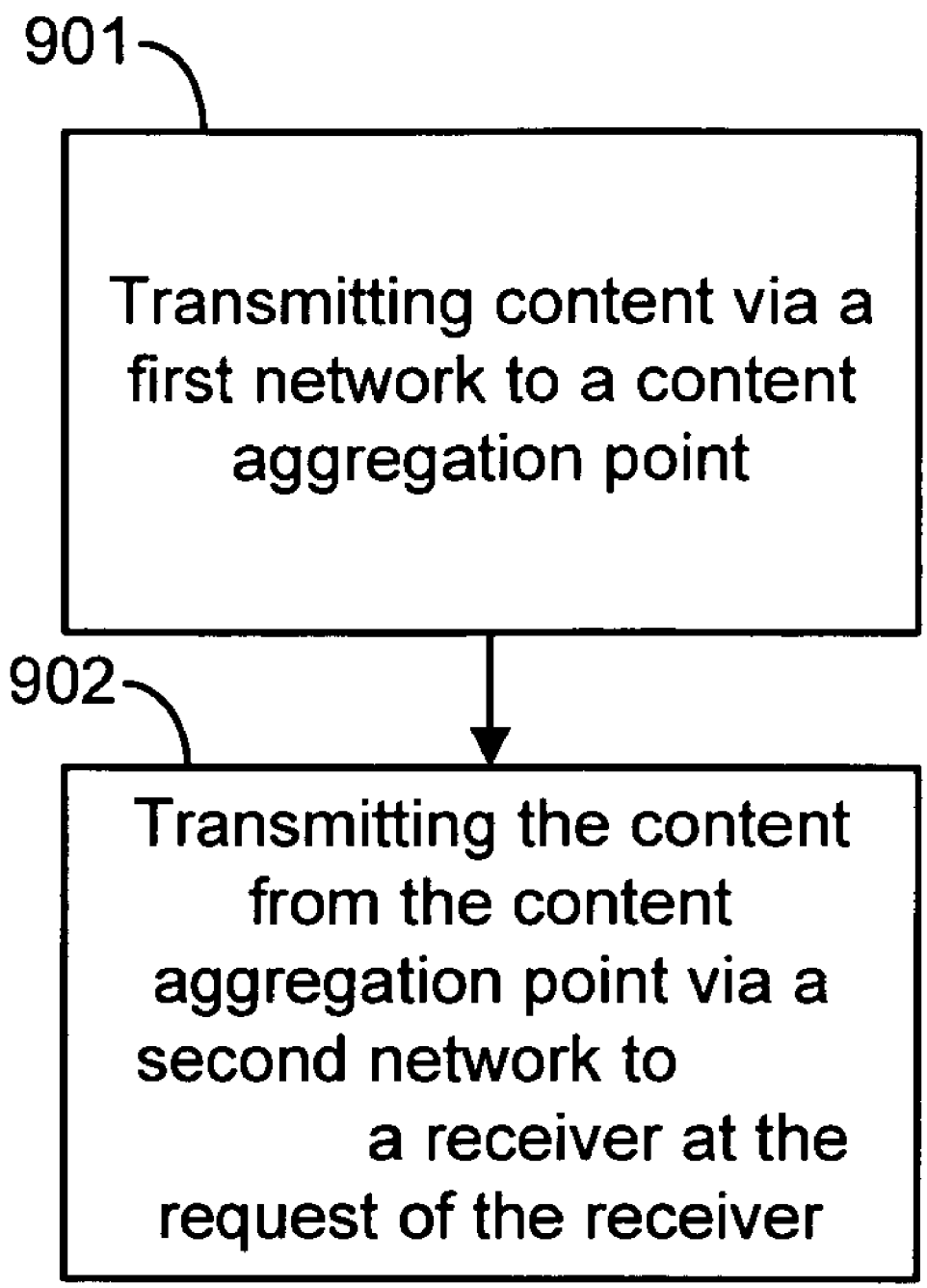
FIG. 9 illustrates steps in an exemplary method for content delivery.

FIG. 9 illustrates steps in an exemplary method for content delivery comprising transmitting content via a first network to a content aggregation point at block 901. Then, transmitting the content from the content aggregation point via a second network to a receiver at the request of the receiver at block 902.

Also described herein are improvements in the functionality of the aforementioned network architecture. These improvements include in-band measurement of network statistics, multi-constraints based QoS routing, and backup paths.

II. In-Band Measurement of Network Statistics

Described herein is a method for measuring network statistics using payload data that is being transmitted over the network. Network statistics such as available bandwidth, loss rate, delay, etc., vary dynamically over time. Determination of these network characteristics is necessary to reliably support QoS requirements. This can be especially true for audio-visual data that need to satisfy stringent QoS requirements. Existing techniques for measuring network statistics use probing packets that are specifically used to support measurement. These probing packets do not carry any useful information between the two end nodes, nodes can be contributors (encoders) or any computing device, involved in the measurement and the probing packets are discarded after being received. See, M. Jain and C. Dovrolis, Pathload: A Measurement Tool for End-to-End Available Bandwidth, Proceedings of Passive and Active Measurements (PAM) 2002 workshop, pages 14-25, Fort Collins, Colo., herein incorporated by reference in its entirety. Such probing techniques therefore consume a portion of the available link bandwidth for measurement and can introduce additional congestion depending on the amount of data used for probing and frequency of measurement. This problem can be mitigated by using in-band measurement, i.e, the data packets that carry information are also used for probing during measurement.

Video compression standards such as MPEG-2, MPEG-4, H.264 require timing information be embedded in the compressed bitstream. This timing information is generated from a common system clock in the encoder and the instantaneous value of this system clock is sampled at specific intervals. Sampled values of the system clock are sent as Program Clock Reference (PCR) fields in the bitstream that are used by the decoder to synchronize its clock to the system clock of the encoder. In addition, the system clock is used to create timestamps called Presentation Time Stamps (PTS) and Decoding Time Stamps (DTS) that is used by the decoder to synchronize the presentation of audio and video. For proper operation of the MPEG2 decoders, the inter arrival times of the packets at the decoder should be the same as intervals used by the encoder during transmission. If the inter arrival times are different at the decoder, then a mechanism is necessary to infer the original intervals for proper operation. As used herein, inter-packet interval time can be defined as the time interval elapsed between two successive packets either during transmission or reception. As used herein, inter-arrival time can be the time that elapsed between the arrivals of two successive packets at a network interface. As used herein, delay jitter is the variability in the one way delay of packets from the transmitter to the receiver.

Specific inter-packet intervals between probing packets can be used to measure the available bandwidth in a network path. For example, a sequence of probing packets with a specific inter-packet interval is transmitted and the corresponding inter arrival times are measured by the receiver. The trend in the inter arrival times on the receive side is used to determine if the available bandwidth is lower or higher than the current transmission rate. As mentioned above, video packets generated by an encoder have specific transmit time requirements to ensure the synchronization of an encoder 401 and a decoder 404. Thus, when video packets are used for probing, the network statistic measurement technique will introduce additional jitter of the packets received at the decoder. A method to accommodate measurement while estimating and minimizing the introduced jitter by using additional timestamps is presented below.

Figure 4:
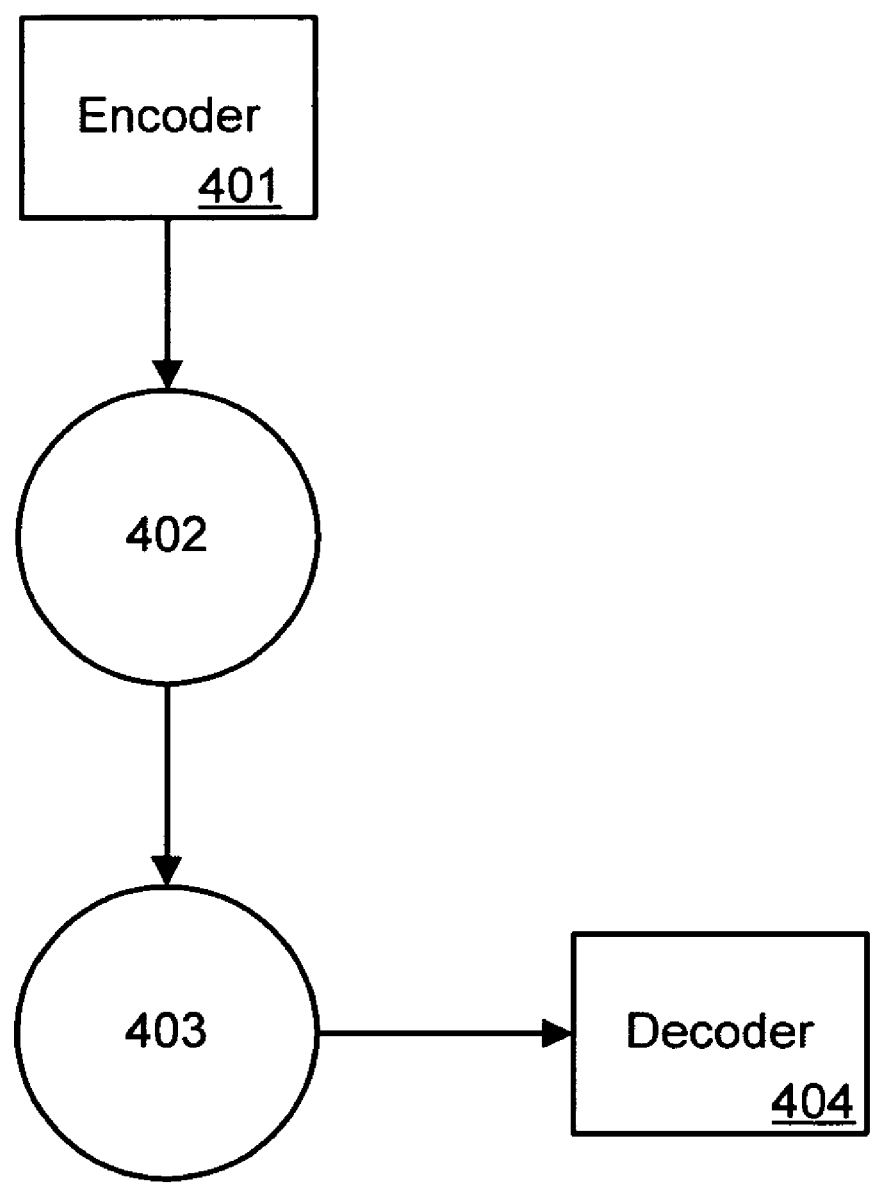
FIG. 4 illustrates an exemplary system for in-band measurement of network statistics with hardware components.
Figure 5:
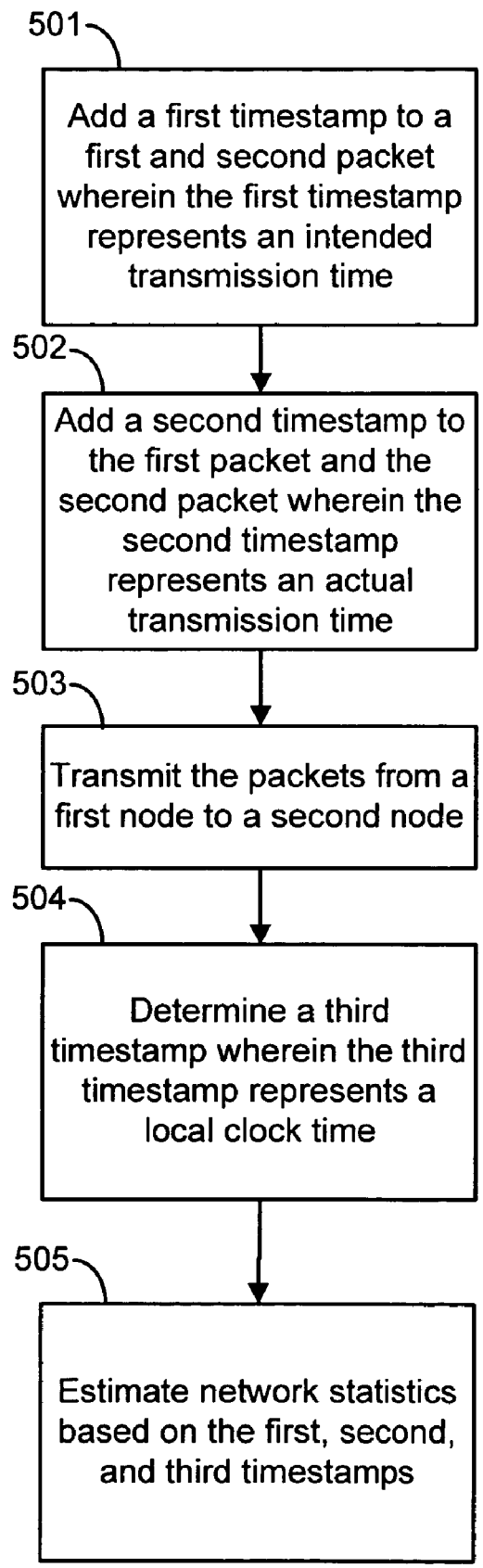
FIG. 5 illustrates an exemplary method for in-band measurement of network statistics.

Described herein is a method for using in-band video, audio, or multimedia packets for probing. An exemplary implementation of the disclosed method is illustrated in FIG. 5, with hardware components illustrated in FIG. 4. An exemplary implementation of a video encoder generates transport stream packets of 188 bytes. An UDP packet is generated by packing seven transport stream packets in the UDP payload. To support in-band measurement, n addition to the PCR timestamps that are carried in certain transport stream packets, each video UDP packet carries an additional timestamp, NTS, which is the intended transmission time of that packet. At block 501, the timestamp can be added either by an encoder 401 or the first node 402 (N1) in a network. NTS(n, N1) corresponds to the value of this field in the nth packet. Before sending the nth packet that is used as a probing packet, node 402 N1 adds a second timestamp TTS(n,N1) from a local clock, at block 502. TTS(n, N1) corresponds to the actual transmission time of the nth packet. Note that the NTS and TTS timestamps are generated from the same clock. If no in-band measurement is performed, then the second time stamp is not necessary since the intended transmission time and the actual transmission time will be the same. When measurement is employed, the transmit times of the packets are dictated by the measurement technique.

TTS corresponds to a transmit time stamp. If video packets are not used for probing, then TTS(n, N1)=NTS(n, N1), i.e., the actual transmit time will be same as the intended transmission time NTS(n, N1). But, when a video packet is used for probing, the TTS(n,N1) is not necessarily equal to NTS(n, N1) because of the specific inter packet transmit intervals required by the measurement algorithm. These TTS timestamps will be used by the probing algorithm for bandwidth estimation. The packets are then transmitted to a second node 403 (N2) at block 503.

After receiving the nth video packet, the receiving node 403 (N2) determines a third timestamp RTS(n,N2) from a local clock, at block 504. RTS corresponds to a receive time stamp. The received timestamps can be used to estimate network statistics, such as the available bandwidth at block 505. An example of bandwidth estimation techniques is disclosed in M. Jain and C. Dovrolis, Pathload: A Measurement Tool for End-to-End Available Bandwidth, Proceedings of Passive and Active Measurements (PAM) 2002 workshop, pages 14-25, Fort Collins, Colo. Any means known in the art for estimating network statistics based on timestamps can be used.

The timestamps can be used to compute network statistics like the available bandwidth. The measured network statistics can be returned to a transmitter or a central monitor/control unit for controlling transmission parameters such as, future transmission rates or routing of network traffic.

In general, the inter arrival times of two packets in node 403 N2 will not be the same as the inter-packet transmit interval at node 402 N1. This can be because of variable delay introduced by the network during transmission and the fact that the clocks in nodes 402 N1 and 403 N2 are not perfectly synchronous. For each received packet, the RTS(n,N2) can be updated to account for the variation introduced during transmission, and the network jitter. The RTS(n,N2) time field can be updated as:

$$RTS'(n,N2)=RTS(n,N2)+(NTS(n, N1)-TTS(n,N1))+D$$

NTS(n, N1)−TTS(n,N1) is the variation in the transmit time (and hence the receive time) introduced by the probing technique. D is the estimate of the additional delay jitter introduced by the network. D can be computed in different ways as follows. A simple method of computing D is to use the difference between inter arrival times of the most recent two packets and the corresponding inter-packet transmit times.

$$D=[TTS(n,N1)-TTS(n-1,N1)]-[RTS(n, N2)-RTS(n-1, N2)]$$

An estimate that uses only the most recent two packets is very susceptible to outliers. A robust method of estimation can use the past and current information from a sequence of packets:

$$D = (1/n) * \sum_{i=0}^{n} [TTS(i, N1) - TTS(i-1, N1)] - [RTS(i, N2) - RTS(i-1, N2)]$$

The local clock in N2 can be synchronized to the local clock in N1. The updated value of RTS'(n,N2) can be used to drive a phased-lock loop (PLL) for synchronizing the clock in node 403 N2 to that of node 402 N1. The difference between RTS'(n+1,N2)−RTS'(n, N2) and NTS(n+1,N1)−NTS(n,N1) can be used to either speed up or slow down the N2 clock. This ensures the synchronization of the clocks in N1 and N2 along with the compensation for the jitter introduced by the probing method and the network.

The NTS(n, N1) value in each packet that were obtained from the local clock in node 402 N1 needs to be updated by timestamps from the local clock at node 403 N2 before the packet is transmitted by node N2. This is updated by adding a constant to RTS'(n,N2) which represents the fixed processing delay incurred in node 403 N2.

As this technique does not use the implicit or explicit bit rate information of the video, this can be used for both constant bit rate streams as well as variable bit rate video streams where the instantaneous rate is not readily available.

III. Multi-Constraints Based QoS Routing for Video Distribution Over Network

Current best-effort routing consists of shortest path routing that optimizes the sum over the constituent links of a single measure like hop-count or delay. Video communication applications have more complex QoS requirements regarding bandwidth, delay, jitter, packet loss, and reliability. To efficiently support the QoS requirements of video applications, overall network performance needs to be optimized by taking load balancing into account when searching the best path for each video traffic. The QoS requirements from video applications are considered as the QoS constraints when a router executes the routing operation. The disclosed multi-constraints based QoS routing algorithms can find a path between a source node and a destination node that optimizes the load-balancing of network and obeys a set of QoS constraints.

Let G(N, E) denote a network topology, where N is the set of nodes and E is the set of links. The characteristics of the links or paths (e.g., delay, hop-count, bandwidth, etc.) are defined as QoS measures, which can be estimated by network measurement tools, one example is mentioned previously (Pathload). The number of QoS measures can be denoted by m. Therefore, the QoS measures of each link can be characterized by an m-dimensional link weight vector, comprising m non-negative QoS weights ($W_i(u, v)$, i=1, . . . , m, (u, v) is the link from node u to node v, (u, v)∈E) as components. A QoS measure of a path can be additive (e.g., delay, hop-count), in which case the weight of that measure equals the sum of the QoS weights of the links defining that path. A QoS measure weight of a path can be the minimum(maximum) of the QoS weights along the path (e.g., available bandwidth).

While selecting the feasible paths to satisfy a QoS requirement, it is better to balance the traffic among the links to improve the overall network performance. This approach ensures that the network will be resilient to the dynamic of the network traffic. The path load of a path P can be defined with its constituent links' load.

Link_load($u,v$)=Link_capacity($u,v$)/Available_bandwidth($u,v$).

Path_load($P$)=MAX$_{(u,v)\in P}$(Link_load($u,v$)).

Disclosed is a path selection method to find a path not only satisfying a QoS requirement, but also maintaining the load balancing in the network by finding a path with minimum Path_load.

Constraints on min(max) QoS can be treated by omitting all links which do not satisfy the requested min(max) QoS constraints, referred to as topology filtering. Constraints on additive QoS are satisfied by checking, $$\text{if } \left( \sum_{((u,v) \in P)} W_i(u, v) < L_i \right) \text{ for each } i = 1 \ldots m.$$

Figure 6:
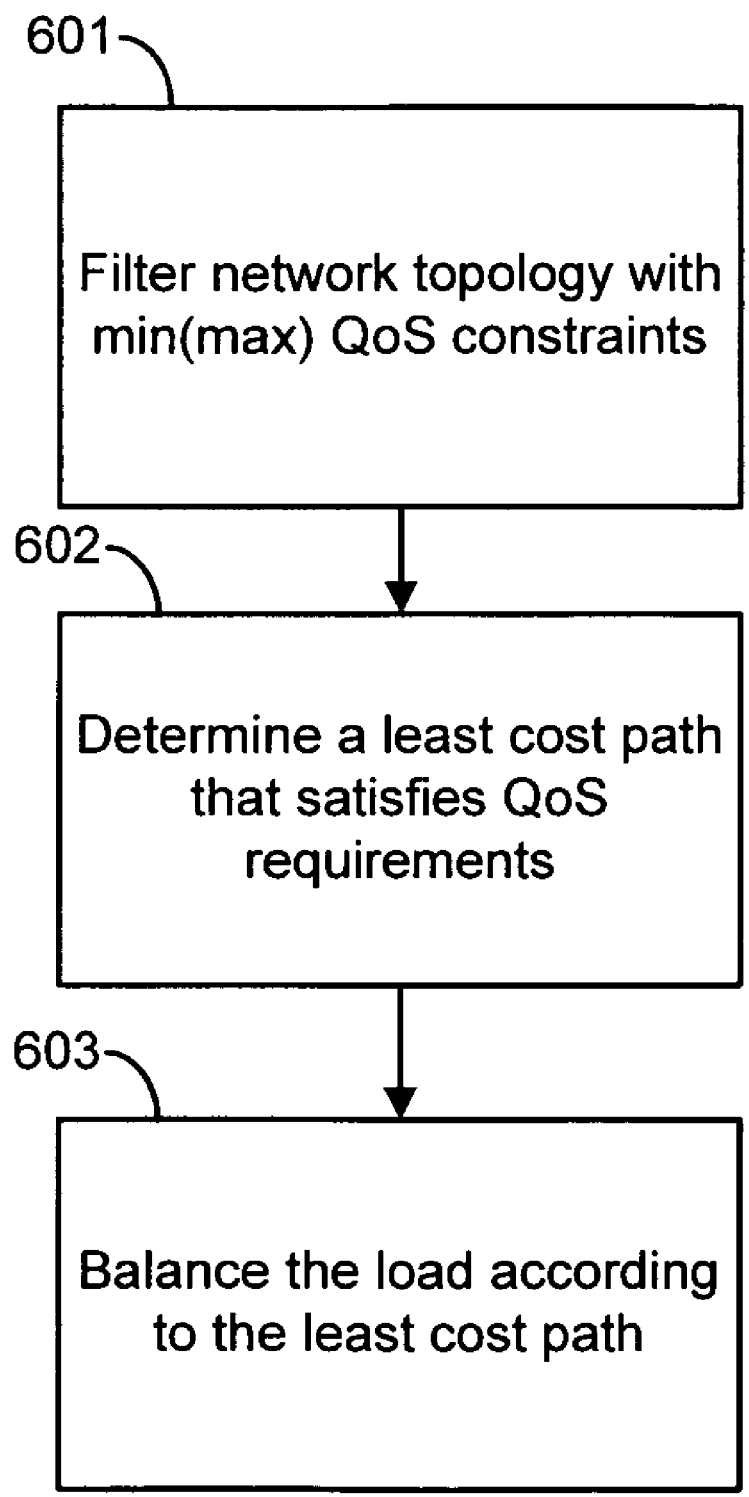
FIG. 6 illustrates exemplary steps in a path selection method.

Exemplary steps in a path selection method of the present invention are illustrated in FIG. 6. At block 601, the network topology G(N, E) is filtered with min(max) QoS constraints, and the result of filtering is denoted as G'(N, E), the new filtered network topology to be considered in the next steps. At block 602, a path selection method is performed. An exemplary path selection algorithm can be based on Dijkstra's least-cost path routing algorithm. See, E. W. Dijkstra, "A note on two problems in connexion with graphs," Numerische Mathematik, no. 1, pp. 269-271, 1959, herein incorporated by reference in its entirety. Dijkstra's least-cost algorithm finds all possible paths between two locations. By identifying all possible paths, Dijkstra's least-cost algorithm identifies the least cost path. Dijkstra's least-cost algorithm can be applied to determine the least cost path between any pair of nodes.

Dijkstra's least-cost algorithm begins by initializing a first vertex in a graph with a permanent label with a value of 0, and all other vertices a temporary label with the value of 0. The edges of the graph have associated costs. The algorithm then proceeds to select the least cost edge connecting a first vertex with a permanent label to a second vertex with a temporary label. The second vertex is then updated from a temporary to a permanent label. The second vertex value is then determined by the addition of the cost of the edge with the first vertex value. The next step is to search for the next least cost edge extending to a third vertex with a temporary label from either the first vertex or the second vertex, change the third vertex label to permanent, and determine its distance to the first vertex. This process is repeated until the labels of all vertices in the graph are permanent. And the permanent label in each vertex is the least-cost of the path from first vertex to this vertex.

In the present invention, QoS constraints can be satisfied by checking $$\text{if } \left( \sum_{((u,v) \in P)} W_i(u, v) < L_i \right) \text{ for each } i = 1 \ldots m$$

over new network topology G'(N, E) at each searching step in the Dijkstra algorithm.

Then, at block 603, the load is balanced on the links of the network according to the least cost path. To balance the load on the links of the network Path_load can be used in, for example, Dijkstra's least-cost path routing algorithm, as a cost index (similar to the permanent label in Dijkstra algorithm mentioned above) to find the least-cost path. Accordingly, the Link_load defined in previous section will be considered as cost of the edge in Dijkstra algorithm mentioned above. While the current vertex value is updated by the addition of the cost of the edge with the previous vertex value in the mentioned Dijkstra's algorithm, here Path_load will be updated with the following rule in each searching step.

Cost_index for current node $$\text{Cost\_Index} = \begin{cases} \max(\text{Old\_Index, Link\_Load}) & \text{if } \left( \sum_{((u,v) \in P)} W_i(u,v) < L_i \right) \text{ for each } i = 1 \ldots m \\ \infty & \text{if } \left( \sum_{((u,v) \in P)} W_i(u,v) > L_i \right) \text{ for any } i = 1 \ldots m \end{cases}$$

And Old_index is updated as Old_index=Cost_Index for the next step of operation.

The method described above can find the path with the most residual resource (least Path_load) among the paths that satisfies a set of QoS constraints. For video applications over this least-cost path, it can take advantage of the residual resource to tolerate dynamic change in the network and obtain better video quality. For a network that employs this multi-constraints based QoS routing method, the overall network performance will be improved because network resources are consumed in a more efficient way to support QoS.

IV. Backup Path for Resilient Network

A. Fast Re-Routing for Recovery of Node/Link Failure

To improve the robustness of a network to link failure, each link in the network can be protected by a backup path. During communication, a router can periodically send probing packets to neighbor routers to detect link failure. Upon detecting a link failure, the flows over the failed link need to be rerouted to a backup path as soon as possible to minimize the interruption period; at the same time, the QoS requirement of the flows over the original link can be satisfied by the backup path. Here the flow is defined as the application data sending from source router directly or through intermediate router(s) to the destination router. The method described herein assumes that the QoS requirement of each flow includes bandwidth and delay, and that any QoS routing method can be used to select the path to satisfy the QoS requirement, including the routing method described previously.

Assuming that there are a large number of flows over each link, a scalable classification based re-routing method is disclosed to find a backup path for each link in a network. The flows in the same class share the same backup sub-path for a given link. The backup path of the class can satisfy the aggregated QoS requirement of all the flows in the class, which includes the summation of all the flows' bandwidth requirements, and minimum delay requirement of all the flows in the class. Two extreme cases for this per-class solution are: 1) all flows over the link are considered as one class, or 2) each flow is considered as a class. Examples are provided, illustrating these two extreme cases.

For the first case, one backup path can be setup for all the flows over a given link. This backup path may not exist because the aggregated bandwidth requirement of the class is so high that there is no single path in the network can satisfy the QoS requirement. Even if there is such a path in the network, when all the flows re-route to this path in case of the given link failure, it can cause a severe load-balancing problem in the network.

For the second case, a backup path can be setup for each flow over the given link. For each flow, a source router needs to run a routing method to find the optimal, also referred to as best, sub-path for this flow from the source to a destination router, and setup a route table over the routers along the sub-path. This process is not scalable to a large number of flows because the sequential route computation and route table setup for each flow can require a significant amount of computational resources and signaling delays.

Figure 7:
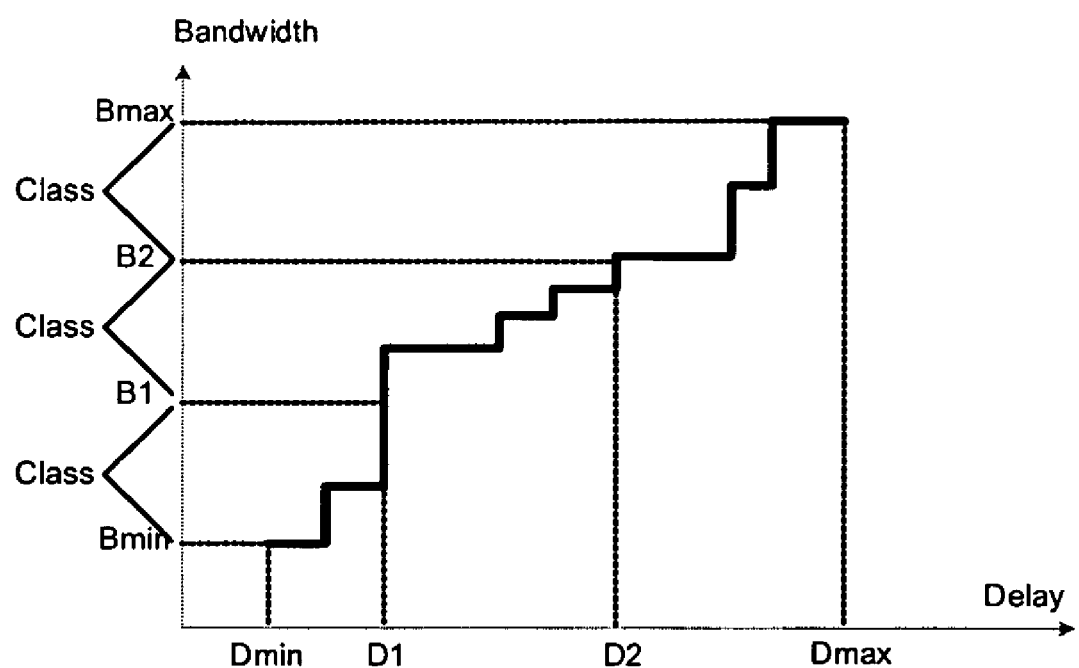
FIG. 7 is a graph illustrating delay limit based classification of flows over a given link.

The class based fast re-routing method disclosed classifies the flows over the given link first and then finds the best sub-path for the particular class with the aggregated QoS requirement based on the per-flow QoS of the flows in the class. It is a tradeoff among computation complexity, signaling delay and system load balancing. FIG. 7, described below, illustrates delay limit based classification of flows over the given link.

B. Method

Figure 8:
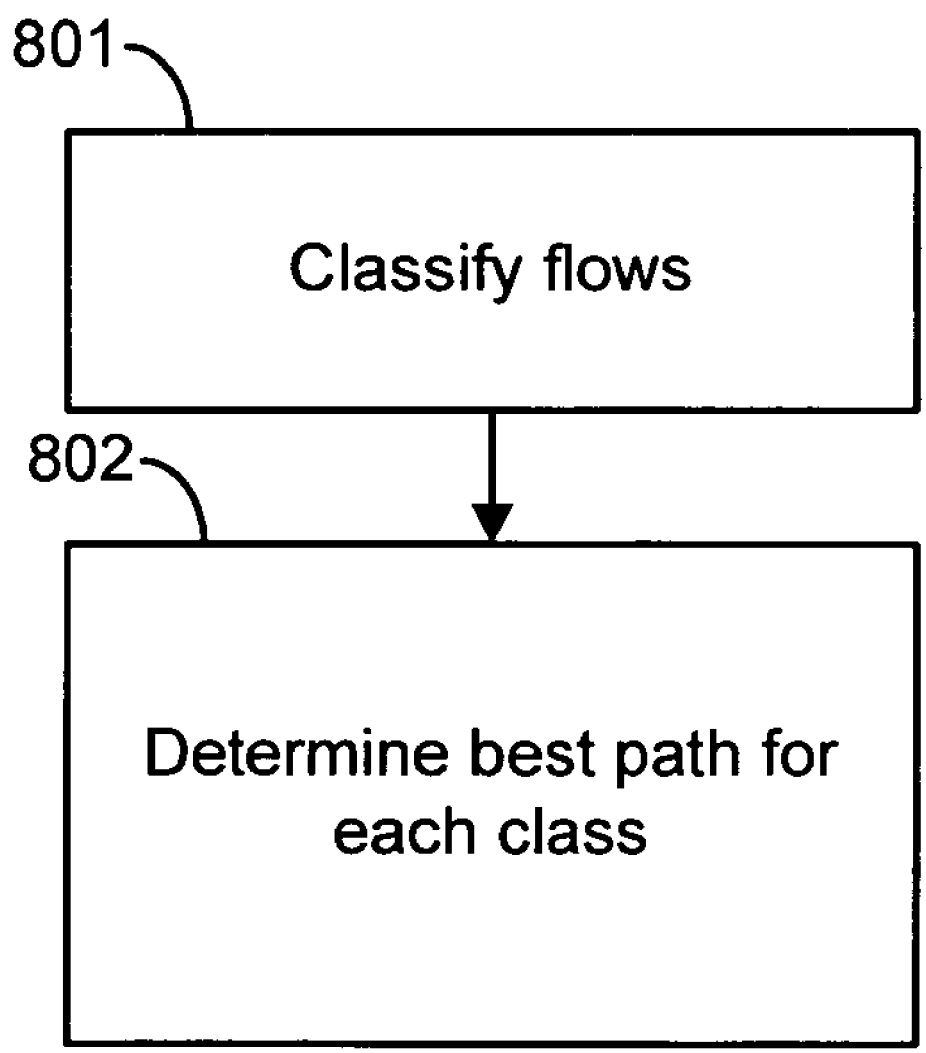
FIG. 8 illustrates an exemplary method for generating a backup path for a network

An exemplary implementation of the disclosed method is illustrated in FIG. 8. At block 801, flows are classified.

i. Classification of Flows

A flow can be classified based on the delay requirement of the flow. Additionally, the bandwidth requirement of each class can be made as similar as possible. This can be accomplished simultaneously with classification.

Let Di be the end to end delay requirement of a flow i. Assuming the actual delay the flow experiencing over link j is dij and $$\sum_j d_{ij} \leq D_i,$$

then delay limit for the backup sub-path for the flow i over given link l will be $$D_{il} = D_i - \sum_{j \neq l} d_{ij}.$$

The delay limit (Dil) of all the flows over the given link l is sorted from Dmin to Dmax as shown in FIG. 7. The bandwidth of each flow can be cumulatively summed as shown by the curve in FIG. 7, where Bmin is the bandwidth requirement of the flow with delay limit of Dmin, and Bmax is the aggregated bandwidth requirement of all the flows over the target link. A goal of the classification here is to provide each class a similar aggregated bandwidth requirement, which can be Bmax/(#class).

In FIG. 7, $$Bi = i * B\max/(\#class) \ (i=1,2 \ldots \#class)$$

and i is the index of class; and using the curve, Bi is mapped to Di, which is in turn used as the boundary for classification of each flow with its delay limit. And #class is the number of class as the result of classification, which can be predefined before classification. The number of classes can also be adaptively determined during the classification. For example, if there is a predefined threshold of the maximum aggregated bandwidth (denoted as B_limit) that can be supported by each class, then #class can adaptively determined by Bmax as (Bmax/B_limit).

Then at block 802, a sub-path is determined.

ii. Sub-Path Determination

For each class, the best path is found from a source router to a destination router that satisfies delay and aggregated bandwidth requirements, this path is referred to as a backup path. The path is found based on the assumption that the current link between source router and destination router is broken. This path can be activated and used only when a router detects the link failure. Any path determination method can be used, including the path determination method described above.

C. Routing Update

The backup path can be updated when network status changes, such as when the network topology changes and flow join/leave etc. To save computational resources at a router, a new classification and/or routing computation can conditionally be performed.

If a flow is leaving the target link, there is no need to re-compute the backup path for the class with which the flow was associated.

If a flow is joining the target link, the router can determine the delay limit for this new flow, and orderly insert this new flow into an existing flow list according to its delay limit. The new flow can be considered as an unclassified flow at this stage. If the aggregated bandwidth of the unclassified flows in this class is still under the given threshold (some percentage of the aggregated bandwidth used for classification (Bmax/#class), then the current classification can apply to this new flow. Otherwise, a new classification is necessary to assure that each class will get similar aggregated bandwidth. Finally, routing information at the nodes along the backup path is updated with the classification and new flow information for this new flow.

The methods can be operational with numerous other general purpose or special purpose system environments or configurations. The methods may be described in the general context of computer instructions, such as program modules, being executed by a computer. Generally, program modules include routines, programs, objects, components, data structures, etc. that perform particular tasks or implement particular abstract data types.

The processing of the disclosed methods can be performed by software components. The disclosed method may be described in the general context of computer-executable instructions, such as program modules, being executed by one or more computers or other devices. Generally, program modules include computer code, routines, programs, objects, components, data structures, etc. that perform particular tasks or implement particular abstract data types. The disclosed method may also be practiced in grid-based and distributed computing environments where tasks are performed by remote processing devices that are linked through a communications network. In a distributed computing environment, program modules may be located in both local and remote computer storage media including memory storage devices.

Implementations of the disclosed methods may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While this invention has been described in connection with preferred embodiments and specific examples, it is not intended that the scope of the invention be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for multi-constraints based QoS routing for content distribution over a network comprising:

filtering a network topology with a first set of QoS constraints resulting in a filtered network topology;

determining a least cost path that satisfies a second set of QoS constraints by performing Dijkstra's least cost path routing algorithm, wherein at each searching step in Dijkstra's least cost path routing algorithm, checking $$\text{if} \left( \sum_{((u,v) \in P)} W_i(u,v) < L_i \right) \text{ for each } i = 1 \ldots m,$$

wherein $L_i$ is the total end-to-end cost constraint that needs to be satisfied, over the filtered network topology, and using PATH_LOAD, $(P) = MAX_{(u,v) \in P}(Link\_load(u,v))$, as a cost index to find the least-cost path; and balancing a network load according to the least cost path.

2. The method of claim 1 wherein the first set of QoS constraints are min(max) QoS constraints.

3. The method of claim 1 wherein the second set of QoS constraints are additive QoS constraints.

4. The method of claim 1 wherein PATH_LOAD is updated with $$\text{Cost\_Index} = \begin{cases} \max(\text{Old\_Index, Link\_Load}) & \text{if } \left(\sum_{((u,v) \in P)} W_i(u, v) < L_i\right) \text{ for each } i = 1 \ldots m \\ \infty & \text{if } \left(\sum_{((u,v) \in P)} W_i(u, v) < L_i\right) \text{ for any } i = 1 \ldots m \end{cases}$$

at each searching step in Dijkstra's algorithm.

5. The method of claim 1, wherein the network load comprises video applications.

6. The method of claim 5, wherein the least cost path has residual resource that satisfies the set of QoS constraints and is used to tolerate dynamic change in a network.

7. A network apparatus for multi-constraints based QoS routing for content distribution over a network comprising:
a router, coupled to a network, wherein the router is configured for
filtering a network topology with a first set of QoS constraints resulting in a filtered network topology;
determining a least cost path that satisfies a second set of QoS constraints by performing Dijkstra's least cost path routing algorithm, wherein at each searching step in Dijkstra's least cost path routing algorithm, checking if $$\text{if } \left(\sum_{((u,v) \in P)} W_i(u, v) < L_i\right) \text{ for each } i = 1 \ldots m,$$

wherein $L_i$ is the total end-to-end cost constraint that needs to be satisfied, over the filtered network topology, and using PATH_LOAD, $(P)=\text{MAX}_{(u,v) \in P}(\text{Link\_load}(u, v))$, as a cost index to find the least-cost path; and
balancing a network load according to the least cost path.

8. The network apparatus of claim 7, wherein the first set of QoS constraints are min(max) QoS constraints.

9. The network apparatus of claim 7, wherein the second set of QoS constraints are additive QoS constraints.

10. The network apparatus of claim 7, wherein PATH_LOAD is updated with

11. The network apparatus of claim 7, wherein the network load comprises video applications.

12. The network apparatus of claim 11, wherein the least cost path has residual resource that satisfies the set of QoS constraints and is used to tolerate dynamic change in a network.

13. A computer readable storage medium having computer executable instructions embodied thereon for multi-constraints based QoS routing for content distribution over a network comprising:

filtering a network topology with a first set of QoS constraints resulting in a filtered network topology;

determining a least cost path that satisfies a second set of QoS constraints by performing Dijkstra's least cost path routing algorithm, wherein at each searching step in Dijkstra's least cost path routing algorithm, checking $$\text{if } \left(\sum_{((u,v) \in P)} W_i(u, v) < L_i\right) \text{ for each } i = 1 \ldots m,$$

wherein $L_i$ is the total end-to-end cost constraint that needs to be satisfied, over the filtered network topology, and using PATH_LOAD, $(P)=\text{MAX}_{(u,v) \in P}(\text{Link\_load}(u, v))$, as a cost index to find the least-cost path; and balancing a network load according to the least cost path.

14. The computer readable storage medium of claim 13, wherein the first set of QoS constraints are min(max) QoS constraints.

15. The computer readable storage medium of claim 13, wherein the second set of QoS constraints are additive QoS constraints.

16. The computer readable storage medium of claim 13, wherein PATH_LOAD is updated with $$\text{Cost\_Index} = \begin{cases} \max(\text{Old\_Index, Link\_Load}) & \text{if } \left(\sum_{((u,v) \in P)} W_i(u, v) < L_i\right) \text{ for each } i = 1 \ldots m \\ \infty & \text{if } \left(\sum_{((u,v) \in P)} W_i(u, v) < L_i\right) \text{ for any } i = 1 \ldots m \end{cases}$$

at each searching step in Dijkstra's algorithm.

$$\text{Cost\_Index} = \begin{cases} \max(\text{Old\_Index}, \text{Link\_Load}) & \text{if } \left( \sum_{((u,v) \in P)} W_i(u, v) < L_i \right) \text{ for each } i = 1 \ldots m \\ \infty & \text{if } \left( \sum_{((u,v) \in P)} W_i(u, v) < L_i \right) \text{ for any } i = 1 \ldots m \end{cases}$$

at each searching step in Dijkstra's algorithm.

17. The computer readable storage medium of claim 13, wherein the network load comprises video applications.

18. The computer readable storage medium of claim 17, wherein the least cost path has residual resource that satisfies the set of QoS constraints and is used to tolerate dynamic change in a network.

* * * * *